(12) United States Patent
Choi et al.

(10) Patent No.: US 11,501,448 B2
(45) Date of Patent: Nov. 15, 2022

(54) ELECTRONIC DEVICE AND OBJECT SENSING METHOD OF ELECTRONIC DEVICE

(71) Applicant: SAMSUNG ELECTRONICS CO., LTD., Suwon-si (KR)

(72) Inventors: Nak Won Choi, Gwangmyeong-si (KR); Hyun A Song, Suwon-si (KR); Jung Seop Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 16/641,842

(22) PCT Filed: Sep. 18, 2018

(86) PCT No.: PCT/KR2018/010946
§ 371 (c)(1),
(2) Date: Feb. 25, 2020

(87) PCT Pub. No.: WO2019/066349
PCT Pub. Date: Apr. 4, 2019

(65) Prior Publication Data
US 2021/0158535 A1    May 27, 2021

(30) Foreign Application Priority Data
Sep. 29, 2017  (KR) .................. 10-2017-0127429

(51) Int. Cl.
*G06T 7/20*    (2017.01)
*G06T 7/11*    (2017.01)
(Continued)

(52) U.S. Cl.
CPC .................. *G06T 7/20* (2013.01); *G06T 7/11* (2017.01); *G06T 7/60* (2013.01); *G06T 7/70* (2017.01);
(Continued)

(58) Field of Classification Search
CPC .................... G02B 3/00; G06K 9/3233; G06T 2207/20021; G06T 2207/30196;
(Continued)

(56) References Cited

U.S. PATENT DOCUMENTS 8,139,896 B1    3/2012    Ahiska et al.
8,982,180 B2    3/2015    Corcoran et al.
(Continued)

FOREIGN PATENT DOCUMENTS

JP    2-214989 A    8/1990
KR    10-1002066 B1    12/2010
(Continued)

OTHER PUBLICATIONS

Communication dated Oct. 29, 2020, issued by the European Patent Office in European Application No. 18863348.1.
(Continued)

*Primary Examiner* — Bobbak Safaipour
(74) *Attorney, Agent, or Firm* — Sughrue Mion, PLLC

(57) ABSTRACT

According to various embodiments of the disclosure, an electronic device may include an image sensor and a processor. The processor may be configured to detect a movement of an object, using an image generated by the image sensor, to identify a size value of the object, to correct a size value of the object based on a location of the object within the image, and to perform an operation corresponding to a movement of the object, based on the corrected size value.

15 Claims, 7 Drawing Sheets

(51) Int. Cl.
*G06T 7/60* (2017.01)
*G06T 7/70* (2017.01)
*G06V 10/25* (2022.01)

(52) U.S. Cl.
CPC .... *G06V 10/25* (2022.01); *G06T 2207/20021* (2013.01)

(58) Field of Classification Search
CPC ..... G06T 5/00; G06T 7/11; G06T 7/20; G06T 7/60; G06T 7/70; G06T 7/80
See application file for complete search history.

(56) References Cited

U.S. PATENT DOCUMENTS

| | | | |
|---|---|---|---|
| 9,571,754 B2 | 2/2017 | Park et al. | |
| 11,004,000 B1 * | 5/2021 | Gutmann | B60W 30/0956 |
| 2012/0257064 A1 | 10/2012 | Kim et al. | |
| 2016/0116740 A1 * | 4/2016 | Takahashi | G02B 27/017 345/8 |
| 2017/0041538 A1 | 2/2017 | Choi et al. | |
| 2017/0097414 A1 * | 4/2017 | You | G01S 13/931 |
| 2018/0150681 A1 * | 5/2018 | Wang | G06N 3/0454 |
| 2019/0241070 A1 * | 8/2019 | Ota | G02B 27/01 |
| 2019/0392783 A1 * | 12/2019 | Yang | G09G 5/14 |
| 2020/0142567 A1 * | 5/2020 | Lim | G06T 11/60 |
| 2021/0049770 A1 * | 2/2021 | Ford | G06V 20/41 |
| 2021/0158535 A1 * | 5/2021 | Choi | G02B 3/00 |

FOREIGN PATENT DOCUMENTS

| | | |
|---|---|---|
| KR | 10-2012-0023284 A | 3/2012 |
| KR | 10-1493946 B1 | 2/2015 |
| KR | 10-2016-0040330 A | 4/2016 |
| KR | 10-2016-0131273 A | 11/2016 |
| KR | 10-1694651 B1 | 1/2017 |

OTHER PUBLICATIONS

"Distortion (optics)", Wikipedia, Sep. 11, 2017, XP055740342, Retrieved from the Internet: URL: https://en.wikipedia.org/w/index.php?title=Distortion_(optics)&oldid=800081708, total 5 pages.

International Search Report (PCT/ISA/210) dated Feb. 1, 2019 issued by the International Searching Authority in International Application No. PCT/KR2018/010946.

Written Opinion (PCT/ISA/237) dated Feb. 1, 2019 issued by the International Searching Authority in International Application No. PCT/KR2018/010946.

Communication dated May 29, 2020, issued by the European Patent Office in European Application No. 18863348.1.

Deuk Hyun Park et al., "Real Time Rectification Using Differentially Encoded Lookup Table", Ubiquitous Information Management and Communication, Feb. 21, 2011, pp. 1-4, (4 pages total).

Communication dated Mar. 16, 2022 issued by the Korean Intellectual Property Office in counterpart Korean Application No. 10-2017-0127429.

* cited by examiner

<201>   <202>

<203>   <204>

<205>   <206>

| a11 | a12 | a13 | a14 | a15 |
|-----|-----|-----|-----|-----|
| a21 | a22 | a23 | a24 | a25 |
| a31 | a32 | a33 | a34 | a35 |
| a41 | a42 | a43 | a44 | a45 |
| a51 | a52 | a53 | a54 | a55 |

FIG. 4

ELECTRONIC DEVICE AND OBJECT SENSING METHOD OF ELECTRONIC DEVICE

TECHNICAL FIELD

The disclosure refers to an electronic device sensing the movement of an object.

BACKGROUND ART

With the development of electronic technologies, various types of electronic products are being developed and distributed. In particular, an electronic device operating in conjunction with an application to support a variety of functions, such as a smart TV, a smartphone, a tablet PC, or the like is being widely supplied nowadays.

The electronic device includes various kinds of sensors for supporting the above-described various services and for the convenience of a user. In particular, to detect whether an object is moved or a user's gesture input, the electronic device including a motion sensor is also widely distributed.

DISCLOSURE

Technical Problem

In an image sensor-based motion detection sensor, the distortion may occur in an image depending on the characteristics of a lens, thereby degrading the sensing performance of the sensor. When the image itself is corrected to prevent the performance from deteriorating according to the distortion of the image, there may be a need for a large amount of computation and excessive time may be spent on image correction, in addition, it is difficult to secure the accuracy of the corrected image.

Various embodiments of the disclosure aim to provide an electronic device and an object sensing method of an electronic device that may prevent performance from degrading according to the distortion of an image without correcting the image, even though the distortion occurs in the image depending on the characteristics of the lens,

Technical Solution

According to various embodiments of the disclosure, an electronic device may include an image sensor and a processor. The processor may be configured to detect a movement of an object, using an image generated by the image sensor, to identify a size value of the object, to correct a size value of the object based on a location of the object within the image, and to perform an operation corresponding to a movement of the object, based on the corrected size value.

According to various embodiments of the disclosure, an object sensing method of an electronic device may include generating an image, using an image sensor, detecting a movement of an object, using an image generated by the image sensor, identifying a size value of the object, correcting a size value of the object based on a location of the object within the image, and performing an operation corresponding to a movement of the object, based on the corrected size value.

According to various embodiments of the disclosure, a computer-readable recording medium recorded a program performing a method including generating an image, using an image sensor, detecting a movement of an object, using an image generated by the image sensor, identifying a size value of the object, correcting a size value of the object based on a location of the object within the image, and performing an operation corresponding to a movement of the object, based on the corrected size value.

Advantageous Effects

According to various embodiments of the disclosure, even when the image generated by an image sensor is distorted, the object detection performance of the sensor may be maintained stably.

DESCRIPTION OF DRAWINGS

FIGS. 3 and 4 show examples of an image divided into a plurality of regions.

MODE FOR INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure. With regard to description of drawings, similar components may be marked by similar reference marks/numerals.

Figure 1:
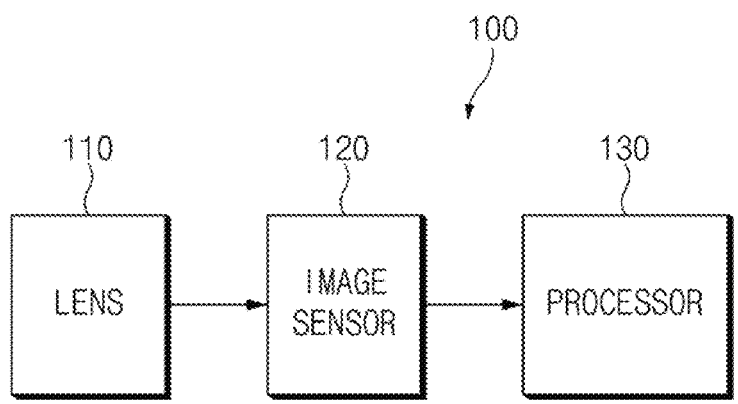
FIG. 1 is a block diagram illustrating a configuration of an electronic device according to various embodiments of the disclosure.

FIG. 1 is a block diagram illustrating a configuration of an electronic device according to various embodiments of the disclosure.

Referring to FIG. 1, an electronic device 100 may include a lens 110, an image sensor 120, and a processor 130. According to an embodiment, the electronic device 100 may further include a communication circuit, a display, a memory, and the like in addition to the configurations. According to an embodiment, the electronic device 100 may include at least one of a TV, a smartphone, a desktop PC, a notebook PC, and a tablet PC.

According to an embodiment, the lens 110 may pass the light reflected by a subject. According to an embodiment, the lens 110 may include a wide-angle lens or a fisheye lens. When the lens 110 includes a wide-angle lens or a fisheye lens, the lens 110 may provide a wider field of view (e.g., more than 150° or more than 180°) than a standard lens, and thus the lens 110 may allow the electronic device 100 to detect a large region.

According to an embodiment, the image sensor 120 may generate an image, using the light received through the lens 110. For example, the image sensor 120 may generate an image by converting subject information included in the light received through the lens 110 into an electrical signal.

According to an embodiment, the processor 130 may control overall operations of the electronic device 100. For example, the processor 130 may be electrically connected to the image sensor 120 to detect whether an object (e.g., a user) is moved or a user's gesture (e.g., hand gesture), using an image generated by the image sensor 120 and then may perform an operation corresponding to the detected result.

According to an embodiment, the processor 130 may perform an operation corresponding to the movement of an object based on the size value of the object of which the movement is detected. For example, when the size value of the detected object is not less than a reference value, the processor 130 may perform an operation corresponding to the movement of the object; when the size value of the detected object is less than the reference value, the processor 130 may ignore the movement of the object. In other words, when the size value of the detected object is less than a reference value, the processor 130 may not perform an operation corresponding to the movement of the object.

According to an embodiment, the electronic device 100 may include the at least one processor 130. For example, the electronic device 100 may include a plurality of processors 130 capable of executing at least one function. According to an embodiment, the processor 130 may be implemented with a system on chip (SoC) that includes a central processing unit (CPU), a graphic processing unit (GPU), a memory, and the like.

According to an embodiment, the subject included in the image generated by the image sensor 120 may be distorted depending on the type of the lens 110. For example, when the lens 110 includes a wide-angle lens or a fisheye lens, the wide angle of view may be provided. However, the subject may be distorted depending on the location of the subject in the image.

Figure 2A:
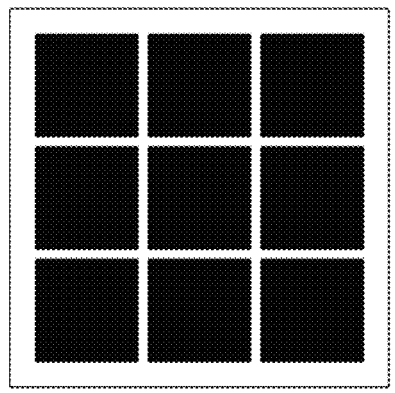
FIGS. 2A to 2C illustrate examples of distorted images.
Figure 2A:
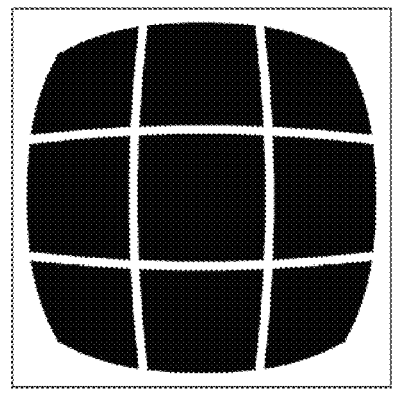
Figure 2B:
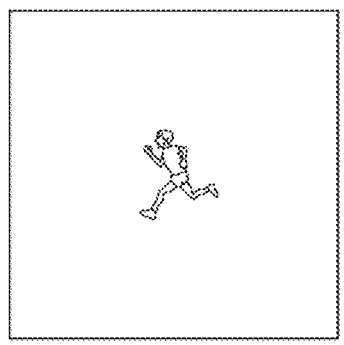
Figure 2B:
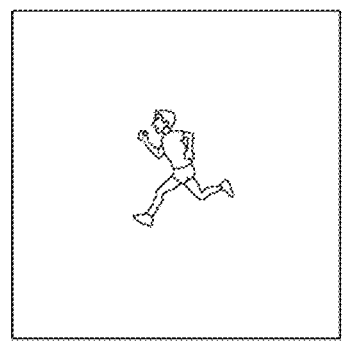
Figure 2C:
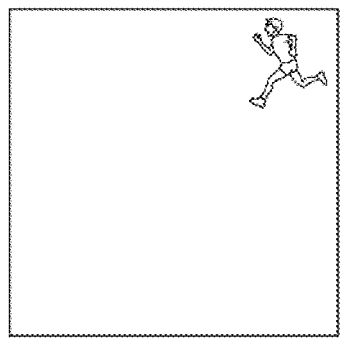
Figure 2C:
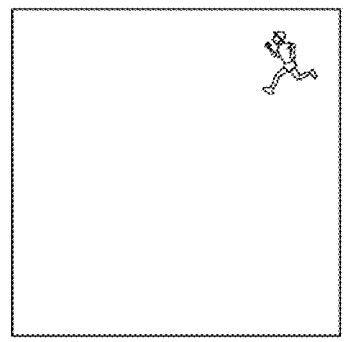

FIGS. 2A to 2C illustrate examples of distorted images.

FIG. 2A illustrates an image of nine square objects having the same shape and size. An image <201> of FIG. 2A shows an example of the image captured through a lens without the distortion of a subject; an image <202> of FIG. 2A shows an example of the image captured through a lens through which a subject is distorted. Referring to the image <201> of FIG. 2, the shapes and sizes of nine square objects are captured identically; however, referring to the image <202> of FIG. 2, it may be seen that the shapes and sizes of nine square objects are captured differently. For example, referring to the image <202>, an object may be captured such that the size of the object increases as the location in the image is closer to the center of the image and the size of the object decreases as the location in the image is away from the center of the image.

FIG. 2B illustrates an image obtained by capturing an object such that the object is located at the center of an image. An image <203> of FIG. 2B shows an example of the image captured through a lens without the distortion of a subject; an image <204> of FIG. 2B shows an example of the image captured through a lens through which a subject is distorted. When the image <203> is compared with the image <204> in FIG. 2B, in the case where the object is located at the center of the image, the size of the object included in the image <204> may be distorted, and thus the object may be captured such that the object included in the image <204> is greater than the object included in the image <203>.

FIG. 2C illustrates an image obtained by capturing an object such that the object is located at the periphery of an image. An image <205> of FIG. 2C shows an example of the image captured through a lens without the distortion of a subject; an image <206> of FIG. 2C shows an example of the image captured through a lens through which a subject is distorted. When the image <205> is compared with the image <206> in FIG. 2C, in the case where the object is located at the periphery of the image, the size of the object included in the image <206> may be distorted, and thus the object may be captured such that the object included in the image <206> is smaller than the object included in the image <205>.

When the subject included in the image is distorted, the object detection performance through the image sensor 120 may be affected. For example, in the case where there is no distortion of the image, an object to be captured with a size smaller than a reference value may be captured with a size greater than or equal to the reference value when the object is located at the center of the image as shown in FIG. 2B. For another example, in the case where there is no distortion of the image, an object to be captured with a size greater than or equal to a reference value may be captured with a size smaller than the reference value when the object is located at the periphery of the image as shown in FIG. 2C.

According to various embodiments of the disclosure, the electronic device 100 may correct the size value of the object of which the movement is detected, to prevent degradation of the object detection performance according to the distortion of the object. According to an embodiment, the processor 130 may detect the movement of the object, using the image generated by the image sensor 120. The processor 130 may identify the object of which the location or shape is changed, by comparing the image currently generated by the image sensor 120 with a reference image. According to an embodiment, the processor 130 may set at least one of the captured images as the reference image. For example, the processor 130 may set the image captured immediately before the currently captured image is captured, as a reference image. For another example, when there is no change in a plurality of images captured during a specified time, the processor 130 may set one of a plurality of images as a reference image.

According to an embodiment, the processor 130 may identify the size of the object of which the movement is detected. For example, the processor 130 may identify the number of pixels occupied by the object of which the movement is detected in the image. According to an embodiment, when the movements of a plurality of objects are detected within a single image, the processor 130 may identify the size value of each of a plurality of objects.

According to an embodiment, the processor 130 may correct the size value of the object of which the movement is detected. For example, the processor 130 may correct the size value of the object, based on the location of the object in the image. Hereinafter, a specific embodiment of correcting a size value of an object will be described with reference to FIGS. 3 and 4.

Figure 3:
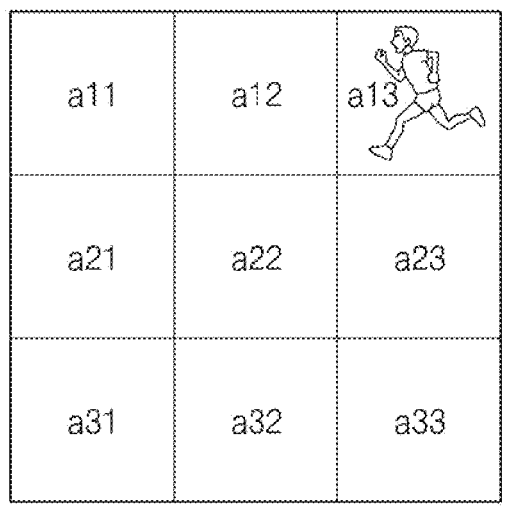

FIGS. 3 and 4 show examples of an image divided into a plurality of regions.

According to an embodiment, the processor 130 may divide an image into a plurality of regions. For example, referring to FIG. 3, the processor 130 may divide the image generated by the image sensor 120 into nine regions a11, a12, a13, a21, a22, a23, a31, a32, and a33. For another example, referring to FIG. 4, the processor 130 may divide the image generated by the image sensor 120 into 25 regions a11, a12, a13, a14, a15, a21, a22, a23, a24, a25, a31, a32, a33, a34, a35, a41, a42, a43, a44, a45, a51, a52, a53, a54, and a55. FIGS. 3 and 4 are only some examples of image division, and the processor 130 may divide an image into various numbers of regions, such as 49, 121, and the like.

According to an embodiment, each of the divided plurality of regions may have a corresponding correction coefficient. As moving away from the center of the image, each of the divided plurality of regions may have a greater correction coefficient; as getting closer to the center of the image, each of the divided plurality of regions may have a smaller correction coefficient. For example, the regions a11, a13, a31, and a33 of FIG. 3 may have a correction coefficient of 1.2; the regions a12, a21, a23, and a32 may have a correction coefficient of 1; the region a22 may have a correction coefficient of 0.8. For another example, the regions a11, a15, a51, and a55 of FIG. 4 may have a correction coefficient of 1.2; the regions a12, a14, a21, a25, a41, a45, a52, and a54 may have a correction coefficient of 1.1; the regions a13, a22, a24, a31, a35, a42, a44, and a53 may have a correction coefficient of 1.0; the regions a23, a32, a34, and a43 may have a correction coefficient of 0.9; the regions a33 may have a correction coefficient of 0.8.

According to an embodiment, the correction coefficient of each of the divided plurality of regions may be determined based on the type and characteristic of the lens 110. For example, the correction coefficient of each of the divided plurality of regions may be predetermined by the manufacturer of the electronic device 100 in consideration of the type and characteristic of the lens 110. For example, when the electronic device 100 includes a lens having a relatively large distortion of the image, the deviation of the correction coefficient may increase relatively; when the electronic device 100 includes a lens having a relatively small distortion of the image, the deviation of the correction coefficient may be relatively small.

According to an embodiment, the processor 130 may identify a region including an object, of which the movement is detected, from among the divided plurality of regions. For example, referring to FIG. 3, the processor 130 may identify that the object is included in the region a13. For another example, referring to FIG. 4, it may be seen that the object is included in the regions a14, a15, a24, and a25.

According to an embodiment, the processor 130 may correct the size value of the object, using the correction coefficient corresponding to the region including the object. For example, the processor 130 may correct the size value of the object by multiplying the size value of the object by the correction coefficient corresponding to the region including the object. Referring to FIG. 3, when the size value of the object included in the image is 1000 and the correction coefficient corresponding to the region a13 including the object is 1.2, the processor 130 may correct the size value of the object to 1200.

According to an embodiment, when the object is included in a plurality of regions, the processor 130 may select one of the plurality of regions, and then may correct the size value of the whole object, using the correction coefficient corresponding to the selected region. According to an embodiment, the processor 130 may correct the size value of the whole object, using the correction coefficient corresponding to a region, which includes the center of gravity of the object, from among the plurality of regions including the object. For example, referring to FIG. 4, the processor 130 may identify the region a15 among the regions a14, a15, a24, and a25 including the object, as the region including the center of gravity of the object. The processor 130 may correct the size value to 1200 by multiplying 1000, which is the total size value of the object included in the image, by the correction coefficient of 1.2 corresponding to the region a15. According to another embodiment, the processor 130 may correct the size value of the whole object, using the correction coefficient corresponding to the region having the greatest size value of the object included in each of the plurality of regions. For example, referring to FIG. 4, the processor 130 may identify the size value of the object included in each of the regions a14, a15, a24, and a25 including the object. For example, the size value of the object included in the region a14 may be 100; the size value of the object included in the region a15 may be 650; the size value of the object included in the region a24 may be 100; the size value of the object included in the region a25 may be 150. The processor 130 may correct the size value of the whole object, using the correction coefficient corresponding to the region a15 having the greatest size value of the included object among the plurality of regions including the object. For example, the processor 130 may correct the size value to 1200 by multiplying 1000, which is the total size value of the object included in the image, by the correction coefficient of 1.2 corresponding to the region a15.

According to an embodiment, when the object is included in a plurality of regions, the processor 130 may identify the size value of the object included in each of the plurality of regions including the object and may correct the size value of the object included in each of the plurality of regions, using the correction coefficient corresponding to each of the plurality of regions. For example, referring to FIG. 4, the processor 130 may identify the size value of the object included in each of the regions a14, a15, a24, and a25 including the object. For example, the size value of the object included in the region a14 may be 100; the size value of the object included in the region a15 may be 650; the size value of the object included in the region a24 may be 100; the size value of the object included in the region a25 may be 150. The processor 130 may correct the size value of the object, which is included in the region a14, to 110 by multiplying 100, which is the size value of the object included in the region a14, by the correction coefficient of 1.1 corresponding to the region a14; the processor 130 may correct the size value of the object, which is included in the region a15, to 780 by multiplying 650, which is the size value of the object included in the region a15, by the correction coefficient of 1.2 corresponding to the region a15; the processor 130 may correct the size value of the object, which is included in the region a24, to 100 by multiplying 100, which is the size value of the object included in the region a24, by the correction coefficient of 1 corresponding to the region a24; the processor 130 may correct the size value of the object, which is included in the region a25, to 165 by multiplying 150, which is the size value of the object included in the region a25 by the correction coefficient of 1.1 corresponding to the region a25. The processor 130 may calculate the correction value of the whole object by summing each of the corrected size values of the object included in a plurality of regions. For example, the processor 130 may sum 110 that is the corrected size value of the region a14, 780 that is the corrected size value of the region a15, 100 that is the corrected size value of the region a24, and 165 that is the corrected size value of the region a25 to calculate 1155 as the correction value of the whole object.

According to an embodiment, the processor 130 may perform an operation corresponding to the movement of the object based on the corrected size value. For example, when the corrected size value of the object is not less than a reference value, the processor 130 may perform an operation corresponding to the movement of the object; when the corrected size value of the object is less than the reference value, the processor 130 may ignore the movement of the object. For example, when the corrected size value of the object of which the movement is detected is not less than the reference value in a state where a display is turned off or is operating in a low power mode, the processor 130 may turn on the display; when the corrected size value is less than the reference value, the processor 130 may ignore the movement of the detected object and may not perform any operation. According to various embodiments of the disclosure, the electronic device 100 may correct only the size value of an object without the correction to the distorted image itself. Accordingly, as a complex image correction algorithm is applied to correct the distorted image, it is possible to improve the object detection performance simply and quickly without excessive the operation and time consumption of the processor.

According to various embodiments of the disclosure, for the purpose of preventing the degradation of the object detection performance according to the distortion of the object, the electronic device 100 may set different reference values to each of a plurality of regions instead of correcting the size value of the object. As moving away from the center of the image, each of the divided plurality of regions may have a smaller reference value; as getting closer to the center of the image, each of the divided plurality of regions may have a greater reference value. For example, the regions a11, a13, a31, and a33 in FIG. 3 may have a reference value of 800; the regions a12, a21, a23, and a32 may have a reference value of 1000; the region a22 may have a reference value of 1200. For another example, the regions a11, a15, a51, and a55 of FIG. 4 may have a reference value of 800; the regions a12, a14, a21, a25, a41, a45, a52, and a54 may have a reference value of 900; the regions a13, a22, a24, a31, a35, a42, a44, and a53 may have a reference value of 1000; the regions a23, a32, a34, and a43 may have a reference value of 1100; the regions a33 may have a reference value of 1200.

According to an embodiment, the reference value of each of the divided plurality of regions may be determined based on the type and characteristic of the lens 110. For example, the reference value of each of the divided plurality of regions may be predetermined by the manufacturer of the electronic device 100 in consideration of the type and characteristic of the lens 110. For example, when the electronic device 100 includes a lens having a relatively large distortion of the image, the deviation of the reference value may increase relatively; when the electronic device 100 includes a lens having a relatively small distortion of the image, the deviation of the reference value may be relatively small.

According to an embodiment, the processor 130 may compare the size value of the detected object with the reference value corresponding to the region including the object, and then may perform an operation corresponding to the movement of the object based on the comparison result. For example, when the size value of the object is not less than to the reference value corresponding to the region including the object, the processor 130 may perform an operation corresponding to the movement of the object; when the size value of the object is less than the reference value corresponding to the region containing the object, the processor 130 may ignore the movement of an object. For example, referring to FIG. 3, when the size value of the object included in the image is 1000 and when the reference value corresponding to the region a13 including the object is 800, the processor 130 may perform an operation corresponding to the movement of the object depending on the comparison result.

According to an embodiment, when the object is included in a plurality of regions, the processor 130 selects one of the plurality of regions and then may compare the size value of the detected object with a reference value corresponding to the selected region. According to an embodiment, the processor 130 may compare the size value of the detected object with a reference value corresponding to a region including the center of gravity of the object among the plurality of regions including the object. For example, referring to FIG. 4, the processor 130 may identify the region a15 among the regions a14, a15, a24, and a25 including the object, as the region including the center of gravity of the object. The processor 130 may compare 1000, which is the size value of the object included in the image, with the reference value of 800 corresponding to the region a15. According to another embodiment, the processor 130 may compare the size value of the detected object with a reference value corresponding to the region having the greatest size value of the object included in each of the plurality of regions. For example, referring to FIG. 4, the processor 130 may identify the size value of the object included in each of the regions a14, a15, a24, and a25 including the object. For example, the size value of the object included in the region a14 may be 100; the size value of the object included in the region a15 may be 650; the size value of the object included in the region a24 may be 100; the size value of the object included in the region a25 may be 150. The processor 130 may compare the total size value of the detected object with a reference value corresponding to the region a15 having the greatest size value of the included object among a plurality of regions including the object. For example, the processor 130 may compare 1000, which is the total size value of the object included in the image, with a reference value of 800 corresponding to the region a15.

Figure 5:
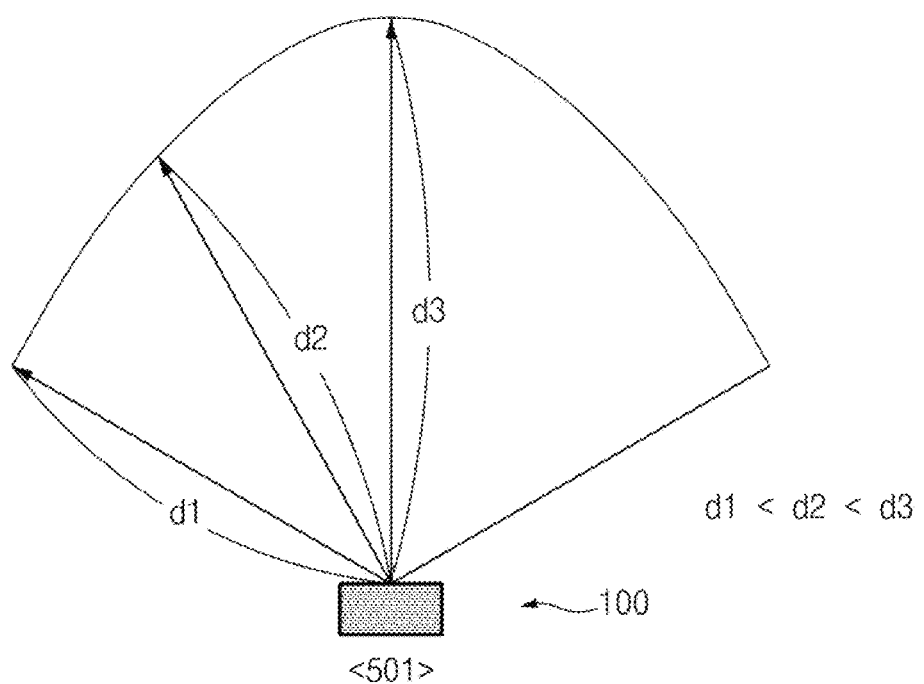
FIG. 5 is a diagram illustrating a reaction distance according to a movement of an object of an electronic device according to various embodiments of the disclosure.
Figure 5:
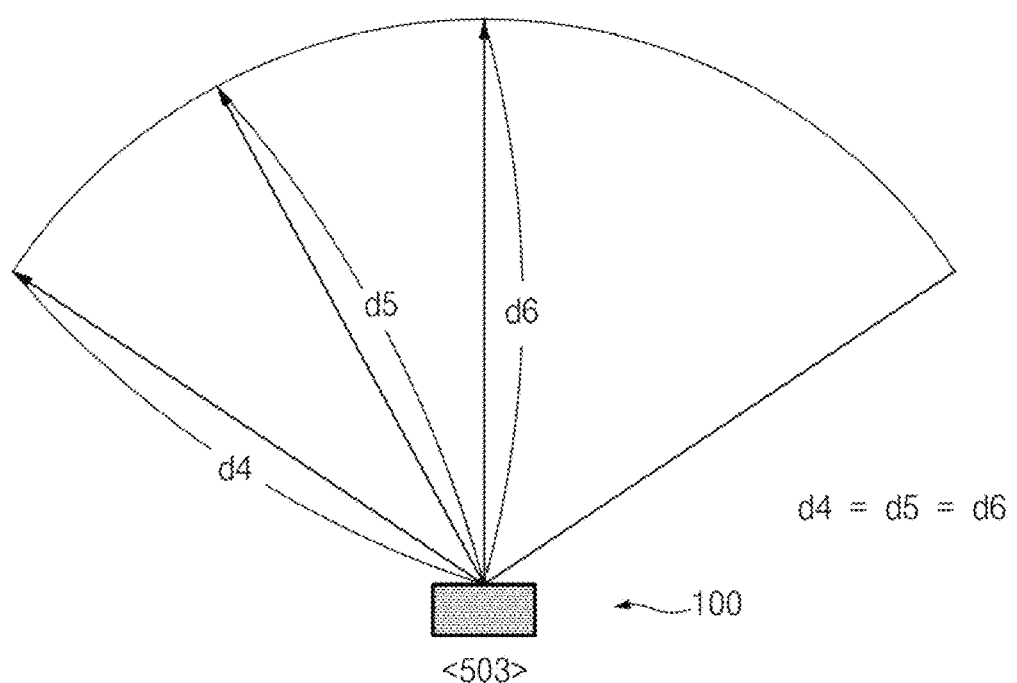

FIG. 5 is a diagram illustrating a reaction distance according to a movement of an object of an electronic device according to various embodiments of the disclosure.

An image <501> of FIG. 5 shows the reaction distance of the electronic device 100 in a state where various embodiments of the disclosure are not applied; an image <503> of FIG. 5 shows the reaction distance of the electronic device 100 in a state where various embodiments of the disclosure are applied. When the movement of the object having the predetermined size is detected within the preset distance, the electronic device 100 may set a reference value to perform an operation corresponding to the movement of the object. For example, in the case where the electronic device 100 is implemented as a TV, only when the movement of a user is detected within the viewing distance of a normal user, the electronic device 100 may set the reference value to perform an operation corresponding to the movement of the user. However, the reaction distance of the electronic device 100 may be changed by the distortion of the object included in an image. For example, referring to the <501> image of FIG. 5, as the object is closer to the side surface of the electronic device, the reaction distance may decrease depending on the distortion of the image; as the object is closer to the front surface of the electronic device, the reaction distance may increase depending on the distortion of the image. Accordingly, the electronic device 100 may react to the movement of an object located at a distance that should not be reacted or may not react to the movement of an object located at the distance to be reacted.

Referring to the <503> image of FIG. 5, as various embodiments of the disclosure are applied, the reaction distance of the electronic device 100 may be constantly maintained regardless of the location of the object. Accordingly, the electronic device 100 may stably maintain the object detection performance even when the captured image is distorted.

Figure 6:
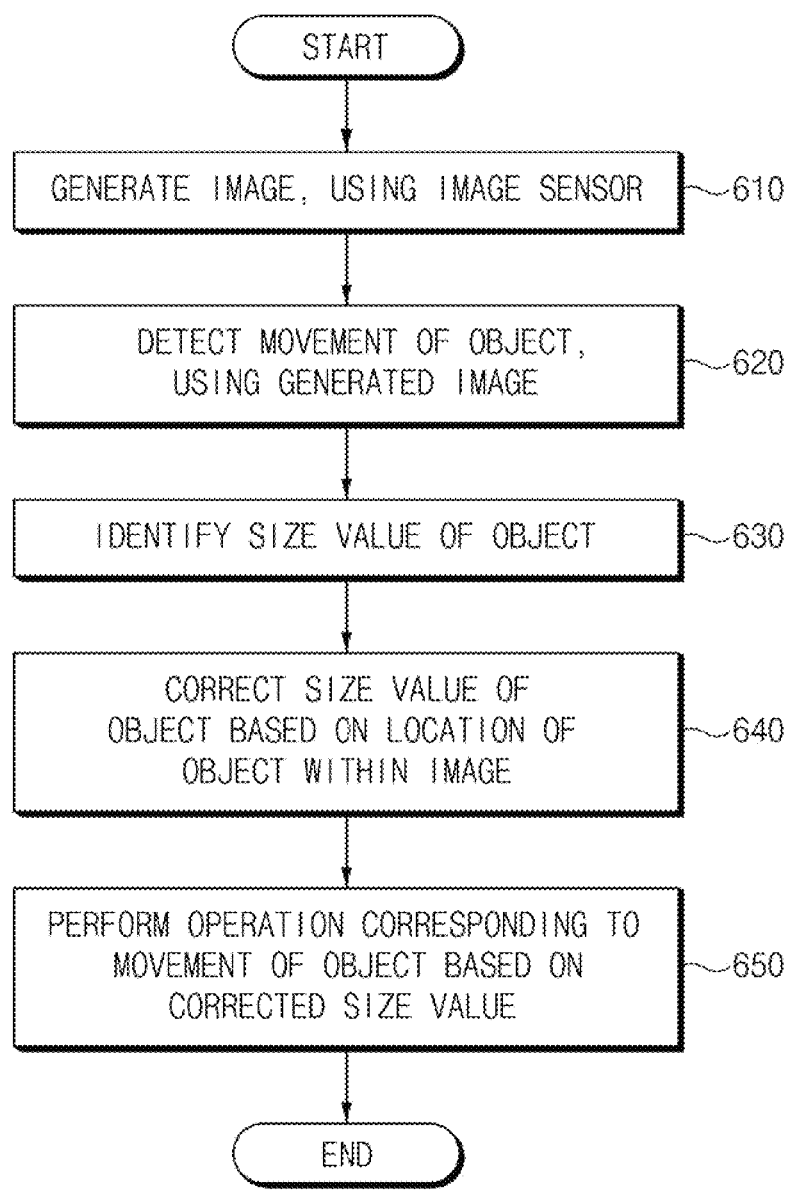
FIG. 6 is a flowchart illustrating an object sensing method of an electronic device, according to various embodiments of the disclosure.

FIG. 6 is a flowchart illustrating an object sensing method of an electronic device, according to various embodiments of the disclosure.

The flowchart illustrated in FIG. 6 may include operations processed by the above-described electronic device 100. Therefore, although there are contents omitted below, contents described about the electronic device 100 with reference to FIGS. 1 to 5 may be applied to the operations shown in FIG. 6.

According to an embodiment, in operation 610, the electronic device 100 may generate an image, using an image sensor (e.g., the image sensor 120 of FIG. 1). For example, the electronic device 100 may generate an image, using light received through a lens (e.g., the lens 110 of FIG. 1). For example, the lens may include a wide-angle lens or a fisheye lens.

According to an embodiment, in operation 620, the electronic device 100 may detect the movement of an object, using the image generated by the image sensor. According to an embodiment, the electronic device 100 may identify the object of which the location or shape is changed by comparing the image currently generated by the image sensor 120 with a reference image. According to an embodiment, the electronic device 100 may set at least one of the captured images as the reference image. For example, the electronic device 100 may set the image captured immediately before the currently captured image is captured, as the reference image. For another example, when there is no change in a plurality of images captured during a specified time, the electronic device 100 may set one of a plurality of images as the reference image.

According to an embodiment, in operation 630, the electronic device 100 may identify the size value of the object of which the movement is detected. For example, the electronic device 100 may identify the number of pixels occupied by the object of which the movement is detected in the image. According to an embodiment, when the movements of a plurality of objects are detected within a single image, the electronic device 100 may identify the size value of each of a plurality of objects.

According to an embodiment, in operation 640, the electronic device 100 may correct the size value of the object based on the location of the object within the image. For example, the electronic device 100 may correct the size value of the object, based on the location of the object within the image.

According to an embodiment, the electronic device 100 may divide the image into a plurality of regions. According to an embodiment, each of the divided plurality of regions may have a corresponding correction coefficient. For example, as moving away from the center of the image, each of the divided plurality of regions may have a greater correction coefficient; as getting closer to the center of the image, each of the divided plurality of regions may have a smaller correction coefficient.

According to an embodiment, the electronic device 100 may identify a region including an object, of which the movement is detected, from among the divided plurality of regions. According to an embodiment, the electronic device 100 may correct the size value of the object, using the correction coefficient corresponding to the region including the object. According to an embodiment, when the object is included in a plurality of regions, the electronic device 100 may select one of the plurality of regions, and then may correct the size value of the whole object, using the correction coefficient corresponding to the selected region. According to an embodiment, the electronic device 100 may identify a region including the center of gravity of the object among a plurality of regions including the object and then may correct the size value of the whole object using a correction coefficient corresponding to the region including the center of gravity. For another example, the electronic device 100 may identify the size value of the object included in each of a plurality of regions including the object and then may correct the size value of the whole object, using the correction coefficient corresponding to the region having the greatest size value of the object included in each of the plurality of regions. According to an embodiment, when the object is included in a plurality of regions, the electronic device 100 may identify the size value of the object included in each of the plurality of regions including the object and may correct the size value of the object included in each of the plurality of regions, using the correction coefficient corresponding to each of the plurality of regions.

According to an embodiment, in operation 650, the electronic device 100 may perform an operation corresponding to the movement of the object based on the corrected size value. For example, when the corrected size value of the object is not less than a reference value, the electronic device 100 may perform an operation corresponding to the movement of the object; when the corrected size value of the object is less than the reference value, the processor 130 may ignore the movement of the object.

Figure 7:
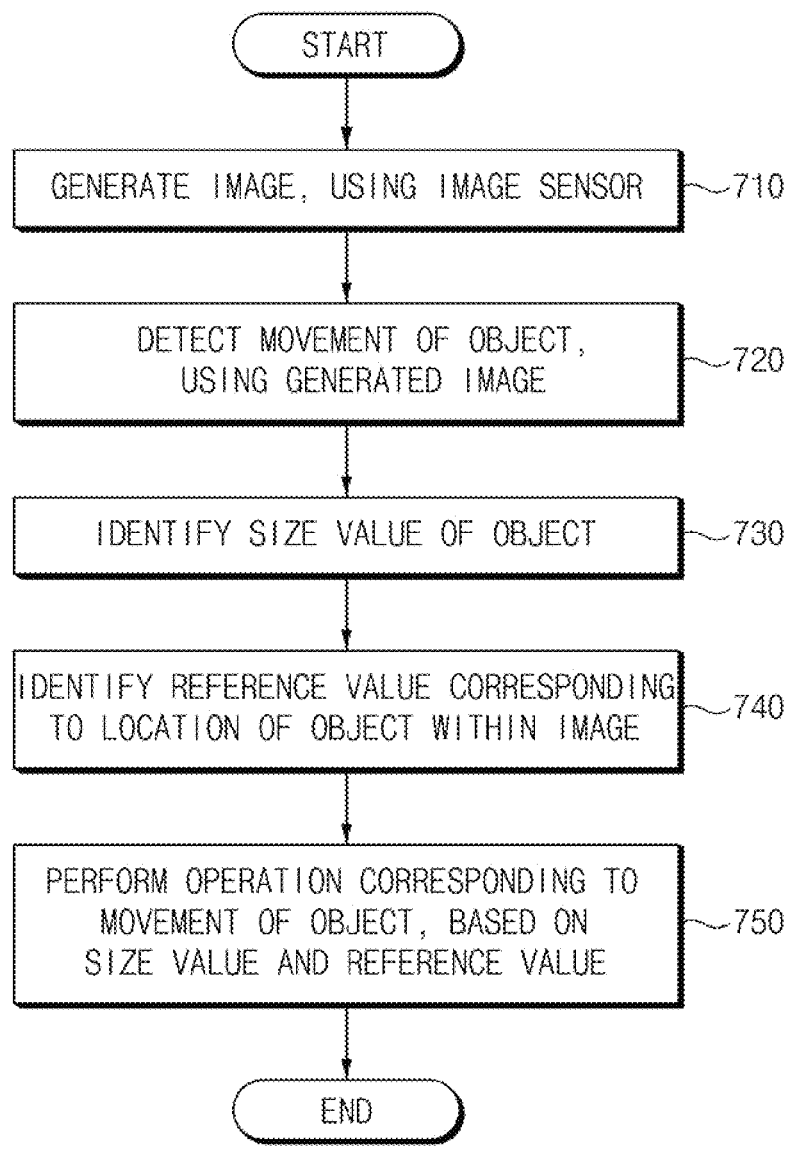
FIG. 7 is a flowchart illustrating an object sensing method of an electronic device, according to various embodiments of the disclosure.

FIG. 7 is a flowchart illustrating an object sensing method of an electronic device, according to various embodiments of the disclosure.

The flowchart illustrated in FIG. 7 may include operations processed by the above-described electronic device 100. Therefore, although there are contents omitted below, contents described about the electronic device 100 with reference to FIGS. 1 to 5 may be applied to the operations shown in FIG. 7.

According to an embodiment, in operation 710, the electronic device 100 may generate an image, using an image sensor (e.g., the image sensor 120 of FIG. 1). For example, the electronic device 100 may generate an image, using light received through a lens (e.g., the lens 110 of FIG. 1). For example, the lens may include a wide-angle lens or a fisheye lens.

According to an embodiment, in operation 720, the electronic device 100 may detect the movement of an object, using the image generated by the image sensor. According to an embodiment, the electronic device 100 may identify the object of which the location or shape is changed by comparing the image currently generated by the image sensor 120 with a reference image. According to an embodiment, the electronic device 100 may set at least one of the captured images as the reference image. For example, the electronic device 100 may set the image captured immediately before the currently captured image is captured, as the reference image. For another example, when there is no change in a plurality of images captured during a specified time, the electronic device 100 may set one of a plurality of images as the reference image.

According to an embodiment, in operation 730, the electronic device 100 may identify the size value of the object of which the movement is detected. For example, the electronic device 100 may identify the number of pixels occupied by the object of which the movement is detected in the image. According to an embodiment, when the movements of a plurality of objects are detected within a single image, the electronic device 100 may identify the size value of each of a plurality of objects.

According to an embodiment, in operation 740, the electronic device 100 may identify a reference value corresponding to the location of the object within the image. According to an embodiment, the electronic device 100 may divide the image into a plurality of regions. According to an embodiment, each of the divided plurality of regions may have a corresponding reference value. For example, as moving away from the center of the image, each of the divided plurality of regions may have a smaller reference value; as getting closer to the center of the image, each of the divided plurality of regions may have a greater reference value.

According to an embodiment, the electronic device 100 may identify the reference value corresponding to a region including an object, of which the movement is detected, from among the divided plurality of regions. According to an embodiment, when the object is included in a plurality of regions, the electronic device 100 may select one of a plurality of regions, and then may identify the reference value corresponding to the selected region. For example, the processor 130 may identify a reference value corresponding to a region including the center of gravity of the object among a plurality of regions including the object. For another example, the electronic device 100 may identify a reference value corresponding to the region having the greatest size value of the included object among the plurality of regions including the object.

According to an embodiment, in operation 750, the electronic device 100 may perform an operation corresponding to the movement of the object, based on the size value of the object and a reference value corresponding to the location of the object. For example, when the size value of the object is not less than a reference value, the electronic device 100 may perform an operation corresponding to the movement of the object; when the size value of the object is less than the reference value, the processor 130 may ignore the movement of the object.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc read only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
an image sensor; and
a processor is configured to:
detect a movement of an object, using an image generated by the image sensor;
identify a size value of the object;
correct the size value of the object based on a location of the object within the image; and
perform an operation corresponding to the movement of the object, based on the corrected size value,
wherein the processor is further configured to:
when the corrected size value is not less than a reference value, perform the operation corresponding to the movement of the object; and
when the corrected size value is less than the reference value, ignore the movement of the object.

2. The electronic device of claim 1, wherein the image sensor is configured to:
generate the image, using light received through a wide-angle lens or a fisheye lens.

3. The electronic device of claim 1, wherein the processor is configured to:
correct only the identified size value of the object without correction to the image.

4. The electronic device of claim 1, wherein the processor is further configured to identify the size value of the object within the image based on a number of pixels occupied by the object within the image.

5. An electronic device comprising:
an image sensor; and
a processor configured to:
detect a movement of an object, using an image generated by the image sensor;
identify a size value of the object;
correct the size value of the object based on a location of the object within the image; and
perform an operation corresponding to the movement of the object, based on the corrected size value,
wherein the processor is further configured to:
divide the image into a plurality of regions;
identify a region including the object among the divided plurality of regions; and
correct the size value of the object, using a correction coefficient corresponding to the region including the object.

6. The electronic device of claim 5, wherein each of the divided plurality of regions has a greater correction coefficient as moving away from a center of the image and has a smaller correction coefficient as getting closer to the center of the image.

7. The electronic device of claim 5, wherein the processor is configured to:
when the object is included in a plurality of regions, identify a region including a center of gravity of the object among the plurality of regions including the object; and
correct a total size value of the object, using a correction coefficient corresponding to the region including the center of gravity of the object.

8. The electronic device of claim 5, wherein the processor is configured to:
when the object is included in a plurality of regions, identify a size value of the object included in each of the plurality of regions including the object; and
correct a total size value of the object, using a correction coefficient corresponding to a region having a greatest size value of an included object among the plurality of regions including the object.

9. The electronic device of claim 5, wherein the processor is configured to:
when the object is included in a plurality of regions, identify a size value of the object included in each of the plurality of regions including the object; and
correct a size value of the object included in each of the plurality of regions, using a correction coefficient corresponding to each of the plurality of regions including the object.

10. An object sensing method of an electronic device, the method comprising:
- generating an image, using an image sensor;
- detecting a movement of an object, using the image generated by the image sensor;
- identifying a size value of the object;
- correcting the size value of the object based on a location of the object within the image; and
- performing an operation corresponding to the movement of the object, based on the corrected size value,
- wherein the performing of the operation corresponding to the movement of the object includes:
- when the corrected size value is not less than a reference value, performing the operation corresponding to the movement of the object;
- when the corrected size value is less than the reference value, ignoring the movement of the object.

11. The method of claim 10, wherein the generating of the image includes:
- generating the image, using light received through a wide-angle lens or a fisheye lens.

12. The method of claim 10, wherein the correcting of the size value of the object includes:
- correcting only the identified size value of the object without correction to the image.

13. The method of claim 10, wherein the identifying of the size value of the object comprises identifying the size value of the object within the image based on a number of pixels occupied by the object within the image.

14. An object sensing method of an electronic device, the method comprising:
- generating an image, using an image sensor;
- detecting a movement of an object, using the image generated by the image sensor;
- identifying a size value of the object;
- correcting the size value of the object based on a location of the object within the image; and
- performing an operation corresponding to the movement of the object, based on the corrected size value,
- wherein the correcting of the size value of the object includes:
- dividing the image into a plurality of regions;
- identifying a region including the object among the divided plurality of regions; and
- correcting the size value of the object, using a correction coefficient corresponding to the region including the object.

15. The method of claim 14, wherein each of the divided plurality of regions has a greater correction coefficient as moving away from a center of the image and has a smaller correction coefficient as getting closer to the center of the image.

* * * * *